(No Model.)
C. D. WELLS.
CUTTER SUPPORTING BAR AND CUTTER.
No. 380,304. Patented Mar. 27, 1888.
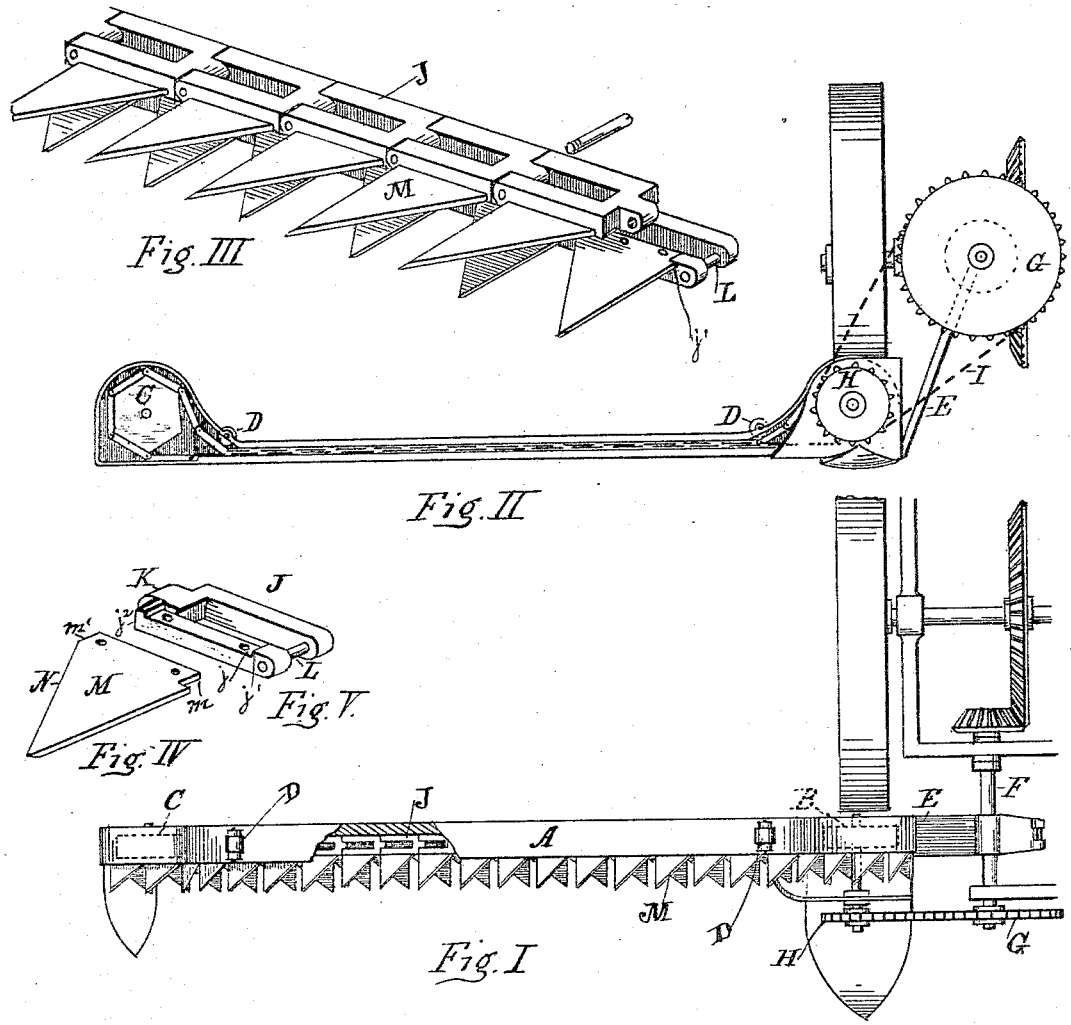

UNITED STATES PATENT OFFICE.

CHARLES D. WELLS, OF MAYSVILLE, KENTUCKY, ASSIGNOR OF ONE-THIRD TO P. P. PARKER AND JOHN T. PARKER, OF SAME PLACE.

CUTTER-SUPPORTING BAR AND CUTTER.

SPECIFICATION forming part of Letters Patent No. 380,304, dated March 27, 1888.

Application filed May 21, 1887. Serial No. 238,978. (No model.)

*To all whom it may concern:*

Be it known that I, CHARLES D. WELLS, of Maysville, in the county of Mason and State of Kentucky, have invented a new and useful Improvement in Cutter-Supporting Bars and Cutters, which improvement is fully set forth in the following specification and accompanying drawings, in which—

Figure I is a top view of my improved cutter-supporting bar; Fig. II, a front view of the same; Fig. III, an enlarged perspective view of a section of the endless chain; Fig. IV, a view of one of the cutters for the bar, and Fig. V a perspective view of one of the links which carry the cutter.

The object of my invention is to produce an improved cutting apparatus for reaping and mowing machines; and it consists of an endless chain formed of a series of links connected with each other by removable threaded pins or blind-screws, which come flush with the edges of the links. Attached to the side of each link and in the plane thereof is the cutter, firmly secured by rivets or screws, and I prefer to form a recess or depression in one side of the link, so that when the shank of the section is riveted in place its face will be in a plane with the link. This endless chain carrying the cutters passes over suitable pulleys at each end of the cutter-supporting bar, the flat sides of the said cutters sliding on each other, so that fingers may be dispensed with.

In applying my invention I provide the cutter-supporting bar A with a pulley, B, of hexagonal or pentagonal form, at its inner or hinged end. This pulley is of such size that each of its peripheral faces will accommodate a link-section. A similar pulley, C, is placed at the outer end of the bar. The endless chain being passed over the respective pulleys with the cutters innermost, said cutters traverse the cutter-supporting bar in opposite directions, being held in close contiguity of movement by means of the confined longitudinal space in which the chain travels. In order to so confine the cutters and hold them together, two friction-pulleys, D D, are placed near the wheels B C, under which the endless chain passes. The inner end of the cutter-supporting bar has an upward extension, E, which is hinged to a shaft, F. This shaft at one end has a gear-wheel, by which it is driven, and on the opposite end a large sprocket-wheel, G. The shaft which carries the inner hexagonal pulley, B, in the cutter-supporting bar has a small sprocket-wheel, H. A chain, I, connects these two sprocket-wheels and imparts motion to the endless-chain cutter.

It is obvious that by having the inner end of the bar E hinged to the shaft F the sprocket-wheels are capable of operation at whatever height the bar may be. For instance, should it be desired to elevate the bar and hold it in a vertical position for trimming the sides of hedge fences, no difficulty will be experienced in manipulating the cutters.

In Fig. V, I show the manner of constructing the link. This is made of a U-shaped blank, J, having an ear, K, at one end, which fits between the sides of the next link. Small bolts or screws L are used to unite these links. One of the sides of the link is rabbeted at $j$, or made thinner from the shoulder $j'$, near one end, to the shoulder $j^2$, where the ear K begins, so as to receive the cutter M, which, when secured to the link, will have one surface even with the surface of one side of the link. One side of the cutter is formed at right angles to the link, while the other side or edge is cut at an angle, thus forming a triangular cutter. The cutter has also a right-angled notch, $m$, in one corner, and at the opposite side, $m'$, is plain. The construction of the link and cutter is therefore such that when the cutter is placed upon the rabbet $j$ the notch $m$ fits snugly against the shoulder $j'$ at one end, and the plain side $m'$ fits against the shoulder $j^2$ at the other end, and when secured in position will be very firmly held in place. The flat sides of these cutters pass each other, the cutting-edges being on the inclined side N.

I may also further adapt the cutter-supporting bar for trimming hedges by curving the bar at any suitable arc and in causing the endless chain to travel over the arc.

What I claim as new is—

1. An endless-chain cutter for harvesters, composed of links made of the U-shaped blanks J, each having an ear, K, at one end, and having one side, $j$, rabbeted to form the shoulders $j'$ and $j^2$, and the bolt L, combined with the cutter M, triangular in shape, and notched on one side at $m$ and the other plain side abutting against the ear K, substantially as described.

2. An endless chain cutter for harvesters, made of U-shaped blanks J, each rabbeted on one side, $j$, to form the shoulders $j'$ and $j^2$, and having ear K at one end, whereby, by means of bolt L, one link is united to the next, and the triangular cutter M, notched at one side and plain on the other, and abutting against the ear K and secured to the link, combined with the bar A, pulleys B and C at the respective ends of said bar, and friction-pulleys D near the other pulleys B and C, under which the said chain passes, the extension E of said bar, and the shaft F, substantially as described.

In testimony that I claim the foregoing I have hereunto set my hand, this 16th day of May, 1887, in the presence of witnesses.

CHARLES D. WELLS.

Witnesses:
JOHN T. BRAMEL,
E. C. MYALL.